United States Patent [19]

Huang et al.

[11] Patent Number: 4,959,147
[45] Date of Patent: Sep. 25, 1990

[54] PAINT DETACKIFICATION USING INORGANIC PARTICLES

[75] Inventors: Shu-Jen W. Huang; Claudia V. Stenger, both of Naperville, Ill.

[73] Assignee: Nalco Chemical Company, Naperville, Ill.

[21] Appl. No.: 267,597

[22] Filed: Nov. 7, 1988

[51] Int. Cl.$^5$ ............................................. C02F 1/52
[52] U.S. Cl. ....................................... 210/712; 55/85; 210/702; 210/714
[58] Field of Search ............... 210/665, 666, 667, 712, 210/714, 725, 727, 728, 702; 55/84, 85; 134/38; 427/331

[56] References Cited

U.S. PATENT DOCUMENTS

| | | | |
|---|---|---|---|
| 2,267,426 | 12/1941 | Saunders et al. | 106/287 |
| 2,362,964 | 11/1944 | Affleck | 117/102 |
| 3,515,575 | 6/1970 | Arnold | 117/102 |
| 4,125,476 | 11/1978 | Dean | 252/115 |
| 4,153,548 | 5/1979 | Forney | 210/52 |
| 4,185,970 | 1/1980 | Dean | 55/89 |
| 4,220,456 | 9/1980 | Block | 55/85 |
| 4,380,495 | 4/1983 | Maher | 210/728 |
| 4,504,395 | 3/1985 | Harpel et al. | 210/712 |
| 4,564,464 | 1/1986 | Harpel et al. | 252/181 |
| 4,629,572 | 12/1986 | Leitz et al. | 210/714 |
| 4,759,855 | 7/1988 | Kaiser | 210/712 |

Primary Examiner—Peter Hruskoci
Attorney, Agent, or Firm—Donald G. Epple; Anthony L. Cupoli

[57] ABSTRACT

Inorganic oxides, particularly silica and alumina, are excellent paint detackifying agents for treating the circulating water in paint spray booths when those oxides have a dry average particle size less than 10 microns.

3 Claims, 1 Drawing Sheet

LAB SCALE SPRAY RECIRCULATION TEST EQUIPMENT

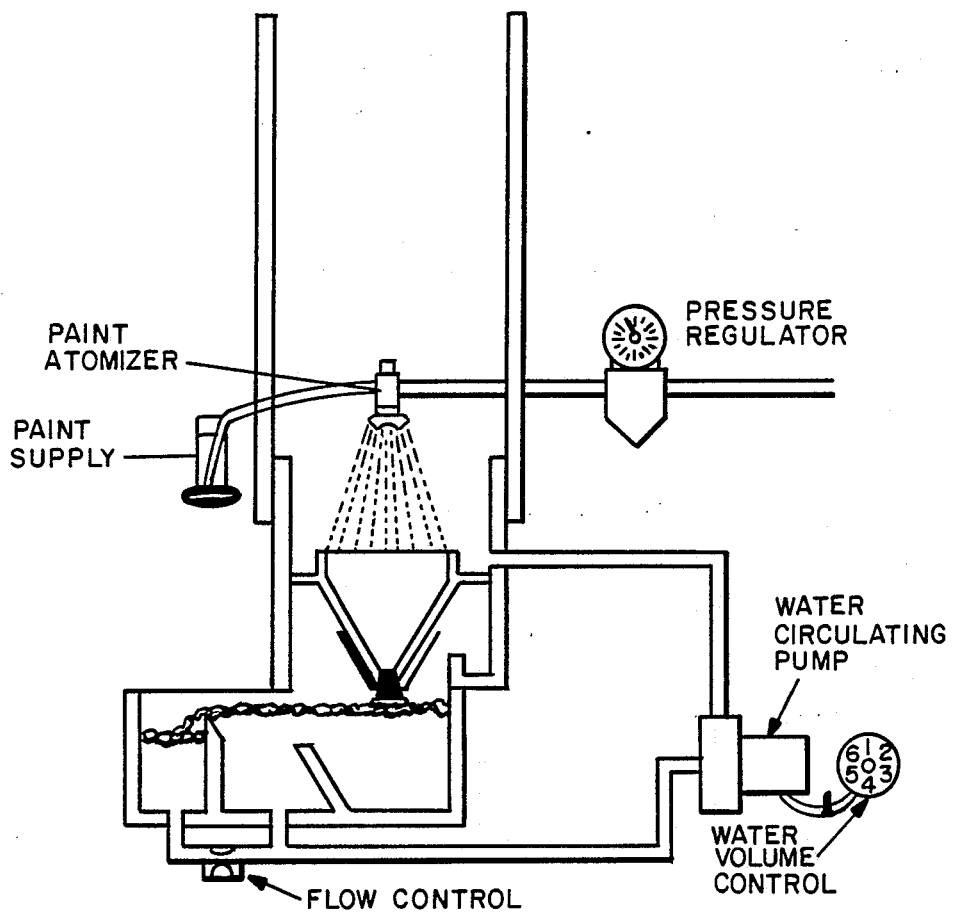

PAINT DETACKIFICATION USING INORGANIC PARTICLES

INTRODUCTION

This invention relates to a wet spray booth treating agent and to a method for the treatment of a wet spray booth by the use of small particle size inorganic oxides for treating spray booths for diminishing the tackiness of coating material entrained in the circulating water to be sprayed for collecting surplus paint. The invention precludes the coating material from adhering fast to the interior of the circulating water systems.

Generally in the coating process of the automotive industry, the yield of the paint applied to an automobile body ranges from 50 to 80% and the remainder 50 to 20% of the used paint constitutes an excess paint to be removed in the subsequent process. For the collection of the surplus paint sprayed excessively, the automobile body is treated in a wet spray booth adapted to give a wash with water and the water so used for the washing is circulated for re-use.

In the wet spray booth constructed as described above, since the surplus paint which is collected in the washing water has high tackiness, it adheres to the water-film panel, the piping system, the spray nozzle, etc. of the spray booth, clogs the piping system and the nozzle, and seriously degrades the efficiency of water washing. Further when the surplus paint so deposited clogs the waste gas discharge system and interferes with the flow air in the spray booth, the vapor of the solvent of the paint fills up the interior of the booth to produce a state dangerous to safety and hygiene and seriously degrade the shop environment. Moreover, the greater part of the surplus paint settles to the bottom of the booth and the bottom of the circulation pit in the spray booth system and the sediment of paint so formed hardens into a rubbery mass with elapse of time and the removal of this hardened mass and the cleaning of the bottoms take up much time and labor.

The paint collected in the washing water not merely undergoes adhesion or sedimentation within the system but also dissolves into components or disperses into fine particles. An increase in dissolved solids accelerates the progress of corrosion inside the system. Further, the solvent in the paint not merely increases the hydrocarbon content of the waste gas from the booth but also dissolves into the cleaning water and increases the COD of the water being circulated. The solvent of the paint, depending on the kind thereof, acidifies the circulating water and consequently accelerates the corrosion of the system.

THE DRAWING

The drawing shows a laboratory test apparatus used to evaluate the invention.

THE INVENTION

The invention comprises a method for the treatment of the circulating water which collects surplus paint in a paint spray booth which comprises treating this water with a paint detackifying agent of a water-dispersible inorganic oxide having a dry average particle size less than 25 microns.

The Inorganic Metal Oxides

The inorganic oxides may be selected from a wide group of materials such as the metal oxides from the group III-B through Group V-A of the Periodic Table. Examples of such metal oxides are the oxides of chromium, molybdenum, titanium, manganese, iron, cobalt, nickel, lead, silver, copper, and cadmium.

Particularly preferred oxides are the oxides of silicon and aluminum. For purposes of this invention, silicon is considered to be a metal.

While many of the oxides illustrated above may be used, several are not considered as being in a preferred category due to their toxic properties.

The term "inorganic metal oxides" as used herein and in the claims is meant to exclude clays.

Particle Size of the Inorganic Metal Oxide

The most critical feature of the invention resides in the fact that the dry particle size of the inorganic metal oxide must be small, e.g. 25 microns or less. In a preferred embodiment, the average particle size is 5 microns or less with a most preferred particle size range being 1 micron or less.

Dosage

The amount of inorganic metal oxide used to produce paint detackification may vary between as little as 1 to as much as 5,000 ppm. A typical dosage, when either finely divided silica or alumina is used, is within the range of 100 to 1,500 ppm, with a preferred range being 400 to 600 ppm. Dosage is based upon the weight of the circulating water used to collect the surplus paint.

Evaluation of the Invention

EXAMPLE 1

In this laboratory test (see the drawing), desired amounts of detackifiers are added to the water manually or using a chemical pump to monitor the chemical demand. These detackifiers are allowed to mix in the tank through water recirculation for 5 minutes. The paint being tested is then sprayed into the chamber at a rate of 2 ml/min. through an air atomized spray gun located 12 inches above the center of the scrubbing section. The test paint is sprayed for 5 minutes, then the paint kill is tested for tackiness or stickiness. The testor wets his hand with the water solution in the test tank, then takes a sample of the floating paint sludge from the water tank, squeezes, and rubs tightly between his fingers. Any tackiness or stickiness present is a poor paint kill. A chart for degree of paint kill is provided below to assure consistent description. A minimum degree of kill of 6 is required to assure booth cleanliness.

At the conclusion of a good paint kill, paint is continuously sprayed, and the paint sludge conditions tested every few minutes. At any given time, if any trace of tackiness of sludge is present, paint spray should be discontinued and the program re-examined. The amount of paint sprayed should be recorded, the chemical dosage, and condition of sludge.

Additional chemicals should be added and paint spray resumed. Repeat this process at least four times.

| Chart for Degree of Paint Kill | |
|---|---|
| 10 Perfect | Complete kill, sludge is soupy |
| 9 Excellent | Paint sludge is non-tacky, non-gritty |
| 8 Very Good | Paint sludge is not tacky or gritty, but slightly plastic, may roll |
| 7 Good | Not tacky, plastic consistency, sludge rolls and can easily reroll |
| 6 OK | Minimum performance, very slightly |

| Chart for Degree of Paint Kill | |
|---|---|
| | tacky. It rolls with water and reroll. Can wash off without rubbing. |
| 5 Borderline | May stick slightly to glove, out falls off with rubbing. |
| 4 Unacceptable | Slight tacky, sticks to glove with pressure, does not rub off, may roll. |
| 3 Moderate failure | Does not roll, stick to glove, smears |
| 2 Severe failure | Tacky, smears |
| 1 Very sticky | Smears |
| 0 Like raw paint | |

Selective aluminas and silicas were used for the paint detackification test. Particle sizes from 22 μ to <0.1 μ were used. The following table gave the product effectiveness versus the particle sizes.

TABLE I

| | Paint Kill | Surface Area Distributions |
|---|---|---|
| Aluminum Oxide C | 8–9 | 78% <0.1μ |
| Alumina 0.05 CR | 7 | 7% <0.1μ |
| Daper Novacite Silica | 7 | 6.4μ |
| Novacite #325 Silica | 6 | 13.0μ |
| KC Abrasive Aluminum Oxide | 5–6 | 15.8μ |
| Catapal SB Alumina | 5–6 | 21.9μ |

All done via Microscan.
Paint kill determination: Osterizer study
Paint used - PPG Red Primer Sp #35

Having thus described our invention, we claim:

1. A method for the treatment of the circulating water which collects surplus paint in a paint spray booth which comprises treating this water with a clay-free paint detackifying agent containing an effective detackifying amount of a water-dispersible clay-free inorganic oxide chosen from the group consisting of the oxides of titanium, manganese, iron, and aluminum, which inorganic oxides have a dry average particle size less than 25 microns, thereby forming a nontacky surplus paint sludge, and then collecting and separating said non-tacky sludge from the circulating water.

2. The method of claim 1 where the inorganic oxide is alumina.

3. The method of claim 2 where the particle size is less than 10 microns.

* * * * *